United States Patent [19]
Iizuka

[11] Patent Number: 5,190,128
[45] Date of Patent: Mar. 2, 1993

[54] LOCK-UP CONTROL DURING SHIFTING

[75] Inventor: Naonori Iizuka, Shizuoka, Japan

[73] Assignee: Jatco Corporation, Tokyo, Japan

[21] Appl. No.: 721,239

[22] Filed: Jun. 26, 1991

[30] Foreign Application Priority Data

Jun. 28, 1990 [JP] Japan .................. 2-171044

[51] Int. Cl.$^5$ .................. F16H 45/02; F16H 61/14
[52] U.S. Cl. .................. 192/3.31; 192/3.58; 74/890
[58] Field of Search .................. 192/52, 92, 3.3, 3.58; 74/890; 475/65

[56] References Cited

U.S. PATENT DOCUMENTS

| | | | |
|---|---|---|---|
| 4,386,687 | 6/1983 | Chevalier et al. | 192/3.3 |
| 4,431,095 | 2/1984 | Suga | 192/3.31 |
| 4,448,293 | 5/1984 | Maeda | 192/3.3 |
| 4,457,410 | 7/1984 | Suga et al. | 192/52 |
| 4,463,842 | 8/1984 | Redzinski | 192/52 |
| 4,476,970 | 10/1984 | Ito | 192/52 |
| 4,531,433 | 7/1985 | Suga | 192/3.31 X |
| 4,582,182 | 4/1986 | Takeda et al. | 192/3.31 |
| 4,640,394 | 2/1987 | Higashi et al. | 192/92 X |
| 4,730,521 | 3/1988 | Hayasaki et al. | 74/867 |
| 4,858,499 | 8/1989 | Ito et al. | 192/3.31 X |

FOREIGN PATENT DOCUMENTS

| | | | |
|---|---|---|---|
| 57-154524 | 9/1982 | Japan | 192/3.58 |
| 60-256676 | 12/1985 | Japan | 192/3.3 |
| 61-136056 | 6/1986 | Japan | 192/3.3 |
| 63-9771 | 1/1988 | Japan . | |

OTHER PUBLICATIONS

Service Manual (Publication No. A261C07) entitled "Nissan Full Range Electronically Controlled Automatic Transmission RE4R01A Type" (1987).

Primary Examiner—Richard Lorence
Attorney, Agent, or Firm—Ronald P. Kananen

[57] ABSTRACT

A lock-up clutch control during a gear shifting is disclosed. A ratio of an input revolution speed of an automatic transmission to an output revolution speed thereof is used to determine whether the gear shifting is in progress. If this is the case, the lock-up clutch is released. A timer is provided which starts measuring time after occurrence of a command for such gear shifting. If the length of time becomes greater than a predetermined value, the lock-up clutch is released.

2 Claims, 5 Drawing Sheets

FIG. 2

| | | C18 | C20 | C22 | C24 | B28 | B26 | OWC 30 | OWC 29 | GEAR RATIO | $\alpha_1 = 0.440$ $\alpha_2 = 0.493$ |
|---|---|---|---|---|---|---|---|---|---|---|---|
| D RANGE | 1ST. SPEED | | | O | | | | O | O | $\dfrac{1+\alpha_2}{\alpha_2}$ | 3.027 |
| | 2ND. SPEED | | O | O | | O | | O | | $\dfrac{\alpha_1+\alpha_2+\alpha_1\alpha_2}{\alpha_2(1+\alpha_1)}$ | 1.619 |
| | 3RD. SPEED | | O | O | O | | | O | | 1 | 1.000 |
| | 4TH. SPEED | | | (O) | O | O | | | | $\dfrac{1}{1+\alpha_1}$ | 0.694 |
| ENGINE BRAKE RUNNING STATE | 1ST. SPEED | | | (O) | O | | O | (O) | (O) | | |
| | 2ND. SPEED | | O | (O) | O | O | | (O) | | | |
| | 3RD. SPEED | | O | (O) | O | | | (O) | | | |
| | 4TH. SPEED | | | (O) | | O | | | | | |
| REVERSE | | O | | | | | O | | | $-\dfrac{1}{\alpha_1}$ | −2.272 |

( ) UNRELATED TO POWER TRANSMISSION

LOCK-UP CONTROL DURING SHIFTING

BACKGROUND OF THE INVENTION

The present invention relates to a method of and a system for a lock-up control during a gear shifting in an automatic transmission.

Japanese Patent Application First (unexamined) Publication No. 63-9771 discloses a lock-up control during a gear shifting in an automatic transmission. According to this known control, beginning and ending of a temporary release of a lock-up clutch are determined in response to a ratio of an input revolution speed indicative signal and an output revolution speed indicative signal.

An object of the present invention is to improve a lock-up control of the above kind such that a delay in release of the lock-up clutch which would cause substantial shift shock is prevented even if in certain circumstances it is difficult to determine a beginning of an intended or desired temporary release of the lock-up clutch.

SUMMARY OF THE INVENTION

According to one aspect of the invention, there is provided a method of a lock-up clutch control during a gear shifting of an automatic transmission which has an input shaft and an output shaft, the method comprising the steps of:

detecting a revolution speed of the input shaft and generating an input revolution speed signal indicative of said revolution speed of the input shaft detected;

detecting a revolution speed of the output shaft and generating an output revolution speed signal indicative of said revolution speed of the output shaft detected;

determining beginning and ending of a temporary release of the lock-up clutch in response to a ratio of said input revolution speed signal to said output revolution speed signal;

measuring a period of time elapsed from occurrence of a command for the gear shifting, determining beginning of the temporary release of the lock-up clutch when said period of time measured becomes greater than a predetermined value; and releasing the lock-up clutch between said determined beginning and ending.

According to another aspect of the invention, there is provided a system for a lock-up clutch control during a gear shifting of an automatic transmission which has an input shaft and an output shaft, the system comprising:

means for detecting a revolution speed of the input shaft and generating an input revolution speed signal indicative of said detected revolution speed of the input shaft;

means for detecting a revolution speed of the output shaft and generating an output revolution speed signal indicative of said detected revolution speed of the output shaft;

a control unit including:

means for determining beginning and ending of a temporary release of the lock-up clutch in response to a ratio of said input revolution speed signal to said output revolution speed signal;

means for measuring a period of time elapsed from occurrence of a command for the gear shifting; and means for determining beginning of the temporary release of the lock-up clutch when said period of time measured becomes greater than a predetermined value; and means for releasing the lock-up clutch between said determined beginning and ending.

BRIEF DESCRIPTION OF THE DRAWINGS

FIG. 2 is a table illustrating which one or ones of a plurality at frictionally engageable couplings are actuated in each gear position or speed;

DETAILED DESCRIPTION OF THE INVENTION

Figure 1:
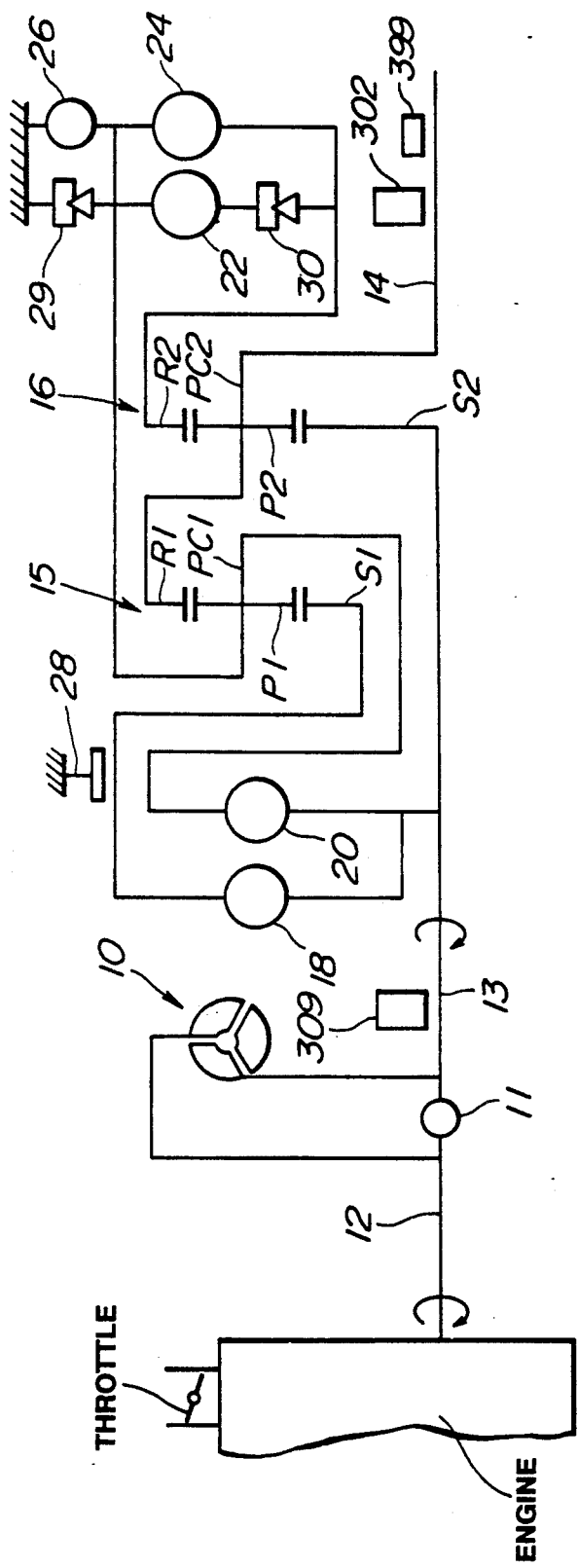
FIG. 1 is a schematic diagram of an automatic stepwise operable transmission coupled with an engine of an automotive vehicle.

Referring to FIG. 1, an automatic stepwise operable transmission is drivingly coupled with a torque converter 10 which is in turn drivingly coupled with an output shaft 12 of an engine of an automotive vehicle. The engine has a throttle valve which opens in degrees. The automatic transmission provides four forward speeds with an overdrive and a single reverse. The transmission includes an input shaft 13 connected to a turbine runner of the torque converter 10, and an output shaft 14 connected to a final drive gear assembly, not illustrated. The transition also includes a first planetary gear set 15, a second planetary gear set 16, a reverse clutch 18, a high clutch 20, a forward clutch 22, an overrunning clutch 24, a low and reverse brake 26, a band brake 28, a low one-way clutch 29, and a forward one-way clutch 30. The torque converter 10 includes therein a lock-up clutch 11. The first planetary gear set 15 comprises a sun gear S1, a ring gear R1, and a pinion carrier PC1 rotatably supporting pinion gears P1, each meshing both the sun and ring gears S1 and R1. The planetary gear set 16 comprises a sun gear S2, a ring gear R2, and a pinion carrier PC2 rotatably supporting pinion gears P2, each meshing both the sun and ring gears S2 and R2. The carrier PC1 is connectable to the input shaft 13 via the high clutch 20, while the sun gear S1 is connectable to the input shaft 13 via the reverse clutch 18. The carrier PC1 is connectable to the ring gear R2 via the forward clutch 22 and the forward one-way clutch 30 arranged in series with the forward clutch 22 or via the overrunning clutch 24 arranged in parallel to both the forward clutch 22 and the forward one-way clutch 30. The sun gear S2 is connected to the input shaft 13, while the ring gear R1 and the carrier PC2 are constantly connected to the output shaft 14. The low and reverse brake 26 is arranged to hold the carrier PC1 stationary, while the band brake 28 is arranged to hold the sun gear S1 stationary. The low one-way clutch 29 is arranged to allow a rotation of the pinion carrier PC1 in a forward direction (the same direction as a direction in which the engine shaft 12 rotates), but preventing a rotation in the opposite reverse direction.

In this transmission, rotating states of various rotary elements (S1, S2, R1, R2, PC1, and PC2) of planetary gear sets 15 and 16 are varied by actuating the hydraulically actuable and frictionally engageable couplings, namely, the clutches 18, 20, 22, 24, and brakes 26, 28, in different kinds of combinations, thereby to vary a ratio, i.e., a gear ratio, of a revolution speed of the input shaft 13 to a revolution speed of the output shaft 14. Four forward speeds and a single reverse speed are provided by actuating the clutches 18, 20, 22, and 24, and the brakes 26 and 28 in various combinations as shown in FIG. 2. In FIG. 2, the sign ◯ (circle) denotes that a particular coupling to which it is assigned is actuated or engaged, the signs α 1 (alpha one) and α 2 (alpha two) designate a ratio of a number of teeth of the ring gear R1 to that of the sun gear S1 and a ratio of a number of teeth of the ring gear R2 to that of the sun gear S2.

Figure 3:
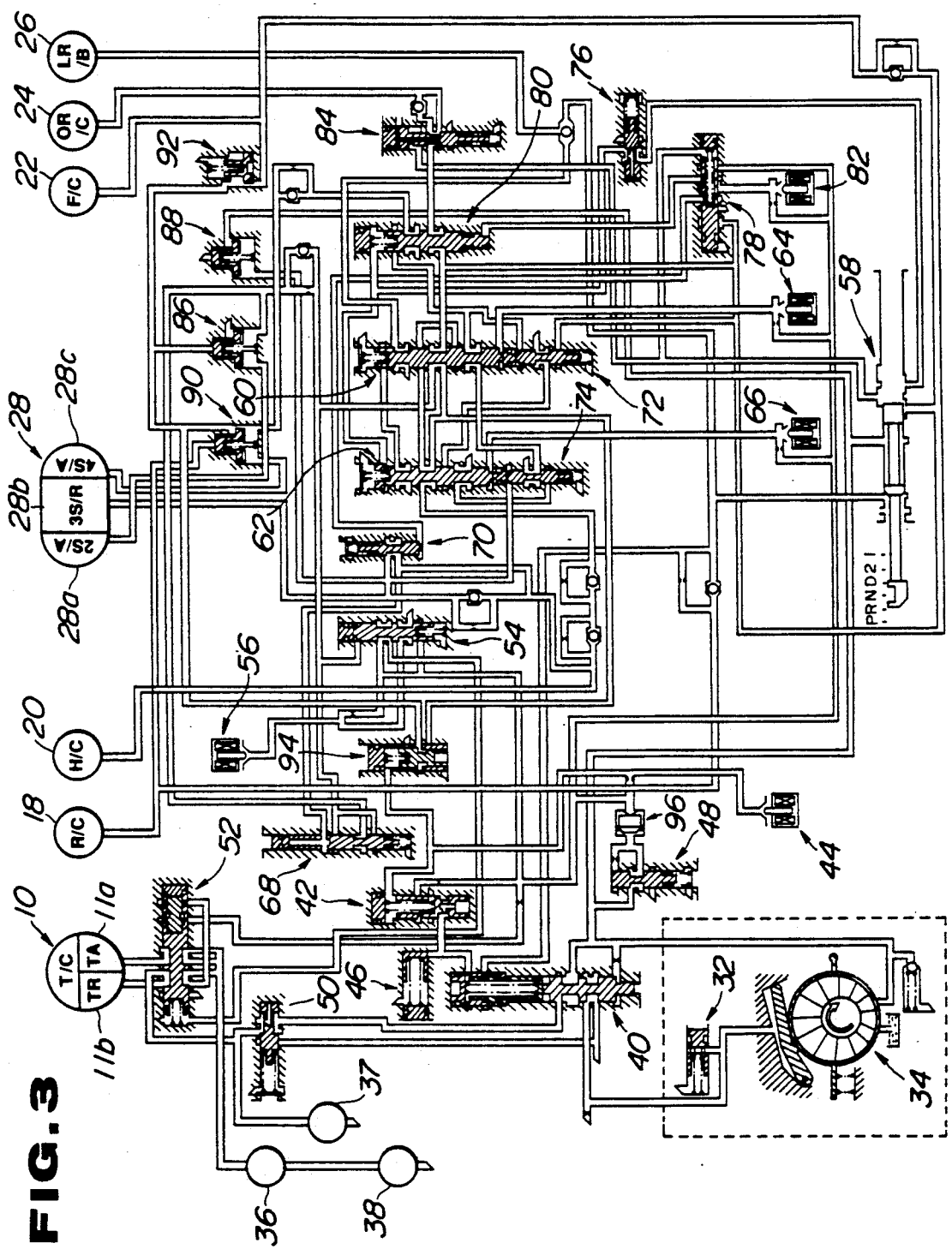
FIG. 3 is a circuit diagram of a hydraulic control system of the automatic transmission.

FIG. 3 shows a hydraulic control system of the transmission. This hydraulic control system comprises a pressure regulator valve 40, a pressure modifier valve 42, a line pressure solenoid 44, a modifier pressure accumulator 46, a pilot valve 48, a torque converter relief valve 50, a lock-up control valve 52, a first shuttle valve 54, a lock-up solenoid 56, a manual valve 58, a first shift valve 60, a second shift valve 62, a first shift solenoid 64, a second shift solenoid 66, a servo charger valve 68, a 3-2 timing valve 70, a 4-2 relay valve 72, a 4-2 sequence valve 74, a first reducing valve 76, a second shuttle valve 78, an overrunning clutch control valve 80, an overrunning clutch solenoid 82, an overrunning clutch reducing valve 84, a 1-2 accumulator 86, a 2-3 accumulator 88, a 3-4 accumulator 90, a N-D accumulator 92, an accumulator control valve 94, and a filter 96. These components are interconnected as illustrated. As illustrated, they are connected also to the before-mentioned torque converter (the torque converter 10 includes an apply chamber 11a and a release chamber 11b for the lock-up clutch 11), the forward clutch 22, the high clutch 20, the band brake 28 (the band brake 28 including a second speed apply chamber 28a, a third speed release chamber 28b, and a fourth speed apply chamber 28c), the reverse clutch 18, the low and reverse brake 26, and the overrunning clutch 24. They are connected also to the variable capacity vane type oil pump 34, the oil cooler 36, the forward lubrication circuit 37, and the rear lubrication circuit 38 as illustrated. The detailed description of these valves is hereby omitted. The automatic transmission thus far briefly described is substantially the same as an automatic transmission of the RE4R01A type which is manufactured by Nissan Motor Company Limited in Japan. The automatic transmission of the RE4R01A type is described in a service manual (publication No. A261C07) entitled "NISSAN FULL RANGE ELECTRONICALLY CONTROLLED AUTOMATIC TRANSMISSION RE4R01A TYPE" published by Nissan Motor Company Limited in March, 1987. U.S. Pat. No. 4,730,521 issued to Hayasaki et al. in Mar. 15, 1989 discloses the automatic transmission of the RE4R01A type. Thus, reference is made to the above-mentioned service manual and the U.S. Pat. No. 4,730,521 for a full understanding of the automatic transmission of this type. In this automatic transmission, the lock-up clutch 11 is controlled by the lock-up control valve 52 under the control of the lock-up solenoid 56 such that when the lock-up solenoid 56 is energized or turned ON, the lock-up control valve 52 takes a lock-up position and the lock-up clutch 11 is engaged, while when the lock-up solenoid 56 is deenergized or turned OFF, the lock-up control valve takes a lock-up release position and the lock-up clutch 11 is disengaged or released. The manner of controlling the lock-up solenoid 56 is described on pages I-28 to I-30 of the above-mentioned service manual.

Figure 4:
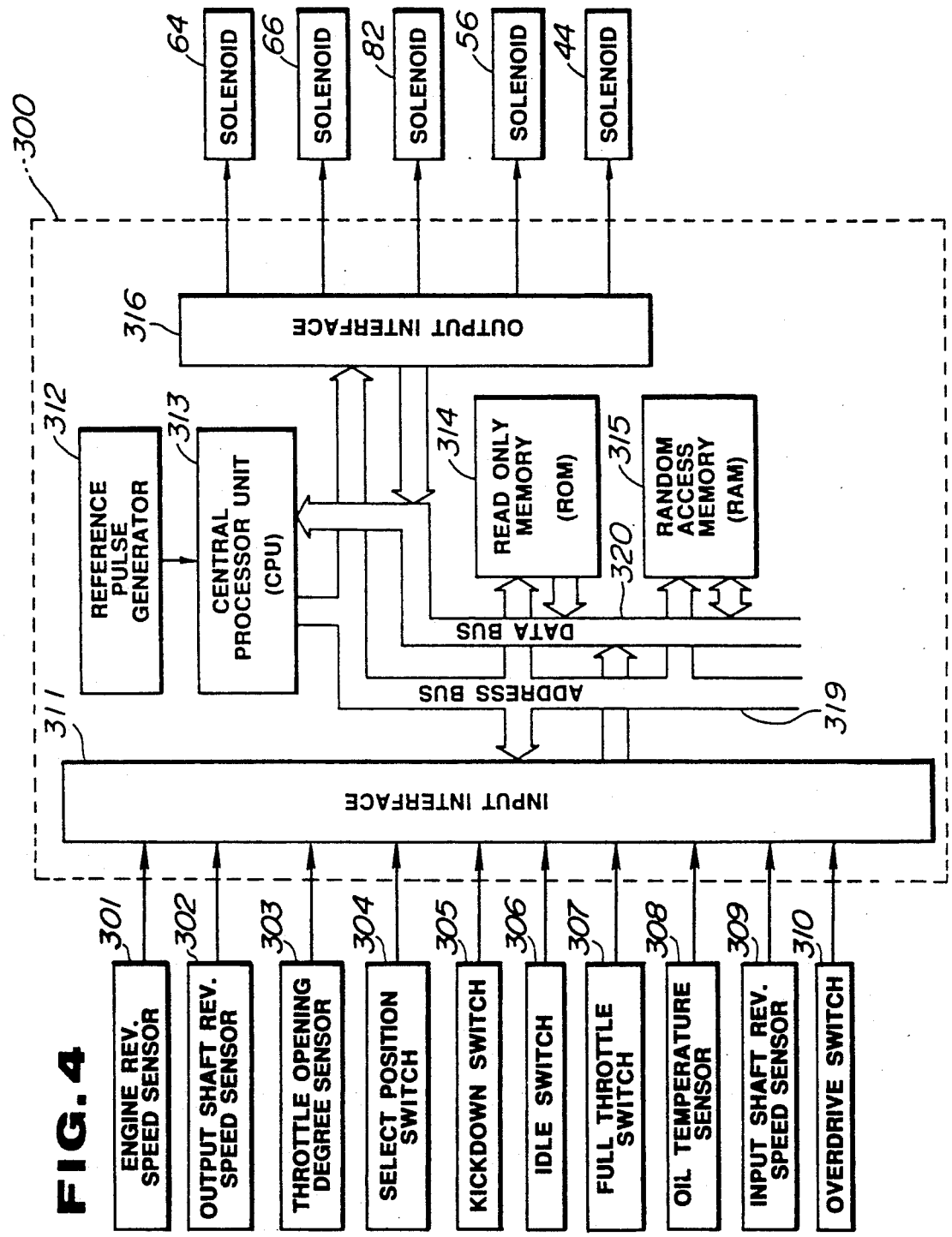
FIG. 4 is a block diagram of an automatic transmission control unit.

FIG. 4 shows an automatic transmission control unit 300 which controls the solenoids 44, 56, 64, 66 and 82. The control unit 300 comprises an input interface 311, a reference pulse generator 312, a CPU (a central processor unit) 313, a ROM (a read only memory) 314, a RAM (a random access memory) 315, and an output interface 316. They are interconnected by an address bus 319, and a data bus 320. Fed to this control unit 300 are output signals of an engine revolution speed sensor 301, an output shaft revolution speed (a vehicle speed sensor) 302, a throttle opening degree sensor 303, a select position switch 304, a kickdown switch 305, an idle switch 306, a full throttle switch 307, an oil temperature sensor 308, an input shaft revolution speed sensor (a turbine revolution speed sensor) 309, and an overdrive switch 310. The output shaft revolution speed sensor 302 detects a revolution speed of the output shaft 14. The input shaft revolution speed sensor 309 detects a revolution speed of the input shaft 13. The outputs of the control unit 300 are supplied to the shift solenoids 64 and 66, overrunning clutch solenoid 82, lock-up solenoid 56, and line pressure solenoid 44.

The shift valves 60 and 62 which are actuable by the corresponding shift solenoids 64 and 66, and pressure modifier valve 42 which is actuable by the line pressure solenoid 44 are controlled by the automatic transmission control unit 300.

Reference is made to pages I-22 to I-27 of the service manual (publication No. A261C07) and to the U.S. Pat. No. 4,730,521 for explanation of actuation of the solenoids 44, 64 and 66, and valves 42, 60 and 62. The necessary control functions are performed in the control unit 300.

Figure 5:
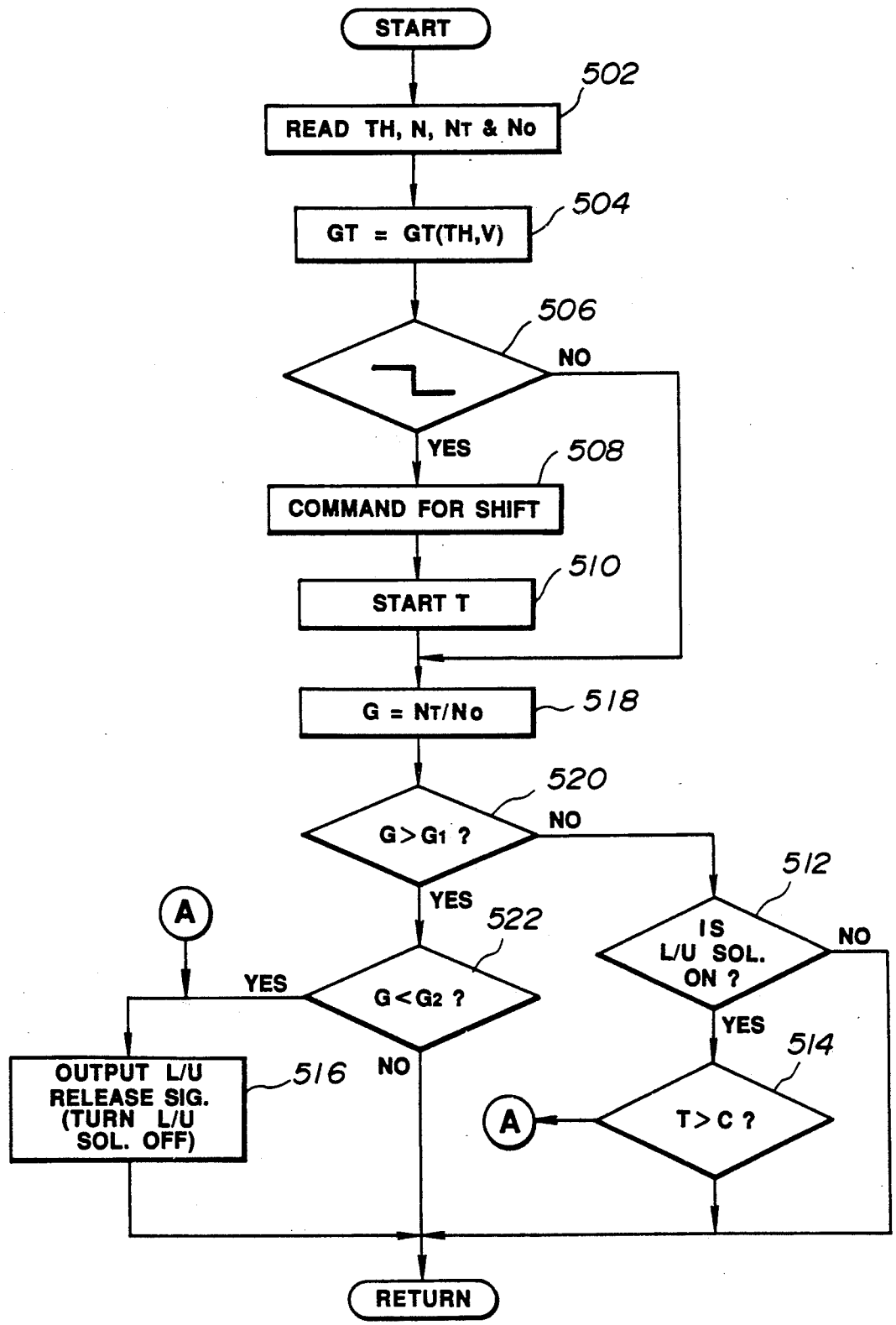
FIG. 5 a flow diagram for explaining the sequence of necessary operating steps.

The manner of the lock-up clutch control is explained below in principle with reference to the flow diagram shown in FIG. 5. FIG. 5 shows an example of a routine for the lock-up clutch control.

In FIG. 5, at a block 502, reading operations of outputs of the throttle opening degree sensor 303, output shaft revolution speed sensor 302, and input shaft revolution speed sensor 309 to store the results as throttle opening degree TH, vehicle speed V, input revolution speed $N_T$ and output revolution speed $N_O$. At the next block 504, a table look-up operation of a shift point mapping table or a shift pattern is performed versus the stored TH and V to give a target gear GT, i.e., a target speed ratio. There is an interrogation at 506 whether a change in target gear GT has occurred. If this is the case, a command for a gear shifting is set at a block 508, and a timer T is started at a block 510. The routine proceeds with these blocks 508 and 510 only once during a run when a determination is made that there has occurred the change in GT. Thus, in the succeeding run, the routine proceeds from the interrogation 506 to a block 518 bypassing the blocks 508 and 510. At the block 518, a ratio G as expressed by $G=N_T/N_O$ is calculated. There is an interrogation at 520 whether G is greater than a first predetermined gear ratio value $G_1$. There is another interrogation 522 whether G is less than a second predetermined gear ratio value $G_2$ that is larger than $G_1$. In this routine, a downshift is considered. During the downshift, the ratio G increases from a gear ratio for an old gear position to a gear ratio for a new gear position. The first and second predetermined gear ratio values $G_1$ and $G_2$ are determined in view of the gear ratios for the old and new gear positions, respectively. If the interrogations at 520 and 522 concurrently, result in affirmatives i.e., $G_1<G<G_2$, the routine proceeds to a block 516. At the block 516, a lock-up clutch release signal is outputted. Upon receipt of this lock-up release signal, the lock-up solenoid 56 is turned OFF or deenergized, causing the lock-up control valve 52 to take a lock-up release position. The interrogation at 520 results in a negative if the ratio G fails to exceed the first predetermined gear ratio value $G_1$. In this case, the routine proceeds to an interrogation at 512 whether the lock-up solenoid 56 is energized or turned ON and then to an interrogation at 514 whether the content of the timer T is greater than a predetermined timer value C. If this is the case, i.e., upon elapse of a period of time C after occurrence of command for gear shifting, the routine proceeds to the above-mentioned block 516 to output lock-up release signal to turn OFF the lock-up solenoid 56.

From the preceding description, it will now be appreciated that the lock-up clutch is released upon an elapse of the predetermined period of time after occurrence of a command for gear shifting even in the circumstances where the stored ratio data G fails to follow a actual change.

What is claimed is:

1. A method of a lock-up clutch control during a gear shifting of an automatic transmission which has an input shaft and an output shaft, the method comprising the steps of:
    detecting a revolution speed of the input shaft and generating an input revolution speed signal indicative of said detected revolution speed of the input shaft;
    detecting a revolution speed of the output shaft and generating an output revolution speed signal indicative of said detected revolution speed of the output shaft; detecting a command for gear shifting;
    measuring a period of time elapsed from occurrence of said command for the gear shifting; calculating a ratio of said input speed to said output speed; releasing said lock-up clutch when said ratio is within a predetermined range; and
    releasing the lock-up clutch if said ratio is not within said predetermined range upon said period of time exceeding a predetermined value.

2. A system for a lock-up clutch control during a gear shifting of an automatic transmission which has an input shaft and an output shaft, the system comprising;
    means for detecting a revolution speed of the input shaft and generating an input revolution speed signal indicative of said detected revolution speed of the input shaft;
    means for detecting a revolution speed of the output shaft and generating an output revolution speed signal indicative of said detected revolution speed of the output shaft;
    a control unit including;
        means for detecting a command for gear shifting;
        means for measuring a period of time elapsed from occurrence of said command for the gear shifting;
        means for calculating a ratio of said input speed to said output speed; means for releasing said lock-up clutch when said ratio is within a predetermined range; and
        means for releasing the lock-up clutch if said ratio is not within said predetermined range upon said period of time exceeding a predetermined value.

* * * * *